United States Patent [19]

Sweeney et al.

[11] 4,028,940

[45] June 14, 1977

[54] LEVEL SENSOR

[75] Inventors: William T. Sweeney; Dennis F. Keller; Gary R. Harris; Calvin N. Armstrong, all of Ponca City, Okla.

[73] Assignee: Continental Oil Company, Ponca City, Okla.

[22] Filed: July 19, 1976

[21] Appl. No.: 706,987

[52] U.S. Cl. .................................. 73/299; 73/392; 138/42

[51] Int. Cl.² ........................................ G01F 23/14

[58] Field of Search .................. 73/299, 392, 290 R; 138/42; 116/118 R; 73/302

[56] References Cited

UNITED STATES PATENTS

| | | | |
|---|---|---|---|
| 2,210,480 | 8/1940 | Brice | 73/392 |
| 2,676,265 | 4/1954 | Green | 73/290 R |
| 3,141,333 | 7/1964 | Lester | 73/299 |
| 3,913,401 | 10/1975 | Sweeney | 73/299 |

*Primary Examiner*—S. Clement Swisher
*Assistant Examiner*—Denis E. Corr
*Attorney, Agent, or Firm*—F. Lindsey Scott; Richard W. Collins

[57] ABSTRACT

A sensor apparatus for determining fluid levels and pressures in a fluid-containing vessel wherein the sensor apparatus comprises a mounting member having a fluid passageway positioned therein; a pressure sensor in operative contact with one end of the mounting member and a pressure fluctuation dampening device operatively positioned on the other end of the mounting member. The dampening device comprises an arrangement of fluid passageways arranged so that the fluid passageway through the mounting member substantially perpendicularly intersects a second fluid passageway intermediate the ends of the second fluid passageway with the second fluid passageway being intersected at each of its ends by third and fourth fluid passageways.

11 Claims, 5 Drawing Figures ly apparatus for use in fluid-containing vessels which are subject to frequent pressure fluctuations.
LEVEL SENSOR

FIELD OF THE INVENTION p This application relates to fluid level and pressure sensing apparatus.

This application more particular

This application also relates to such sensor apparatus for use in vessels containing fluids such as slurries of particulate matter and the like.

BRIEF DESCRIPTION OF PRIOR ART

When vessels are used in the storage of fluids such as gases, liquids, slurries and the like, it is desirable that a method be available for determining the liquid level in such storage vessels and in many instances it is also desirable to determine the pressure inside such vessels. Many sensing devices are currently available for determining such liquid levels and pressures such as the mounting apparatus shown in U.S. Pat. No. 3,913,401 issued Oct. 21, 1975 to Sweeney. In many instances wherein slurries are stored in liquid-containing vessels considerable difficulty is encountered in determining the liquid levels and the pressures inside slurry-containing vessels. For instance the particulate solids in the slurries tend to impinge upon the sensing device thus causing errors in the determinations since it is normally necessary to agitate such slurry-filled vessels. Such solutions are also frequently highly turbulent and the tubulence tends to cause further errors in the determinations. The solids contained in the slurries also tend to build up on and about the sension apparatus thus introducing further errors and the like. In light of the fact that numerous instances are known wherein slurries are stored in slurry-containing vessels, it is highly desirable that a method be available for determining liquid levels and pressures inside such vessels.

OBJECTS OF THE INVENTION

In is an object of the present invention to provide a sensor apparatus which is effective in determining fluid levels and pressures in fluid-containing vessels, particularly those vessels wherein slurries of particulate matter are stored.

SUMMARY OF THE INVENTION

The apparatus of the present invention comprises a sensor apparatus for determining fluid levels and pressures in fluid-containing vessels wherein the sensor comprises a mounting means having a first fluid passageway positioned therethrough; a pressure sensing means in pressure-sensing contact with one end of the first fluid passageway; a pressure fluctuation dampening means positioned in fluid communication with the other end of the mounting means with the dampening means comprising a second fluid passageway positioned in fluid communication with the second end of the first fluid passageway and third and fourth fluid passageways in fluid communication with the second fluid passageway at each of its ends. Desirably the second fluid passageway substantially perpendicularly joins the first fluid passageway and the third and fourth fluid passageways susbstantially perpendicularly intersect the ends of the second fluid passageway.

DESCRIPTION OF PREFERRED EMBODIMENTS

In the description of the drawings the same numbers will be used to refer to the same or similar components throughout the description of the figures.

Figure 1:
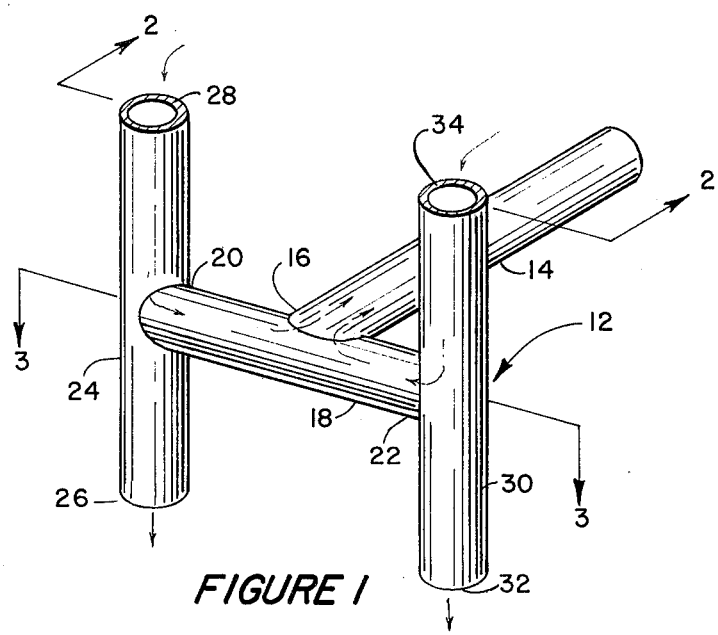
FIG. 1 is an isometric view of an embodiment of the pressure fluctuation dampening means of the present invention.

FIG. 1 is a view of the pressure fluctuation dampening means 12 of the present invention positioned in fluid communication with a first passageway 14 which is in fluid communication with a sensor apparatus 10 (not shown). Dampening means 12 comprises a second fluid passageway 18 in fluid communication with a first end 16 of first passageway 14. A third fluid passageway 24 is positioned in fluid contact with a first end 20 of second fluid passageway 18. A fourth fluid passageway 30 is positioned in fluid communication with a second end 22 of second fluid passageway 18. First fluid passageway 14 joins second fluid passageway 18 at a point intermediate first end 20 and second end 22 of second fluid passageway 18. Second fluid passageway 18 joins third fluid passageway 24 at a point intermediate a first end 26 of third fluid passageway 24 and a second end 28 of third fluid passageway 24. Second fluid passageway 18 joints fourth fluid passageway 30 at a point intermediate a first end 32 of fourth passageway 30 and a second end 34 of fourth fluid passageway 30.

Figure 2:
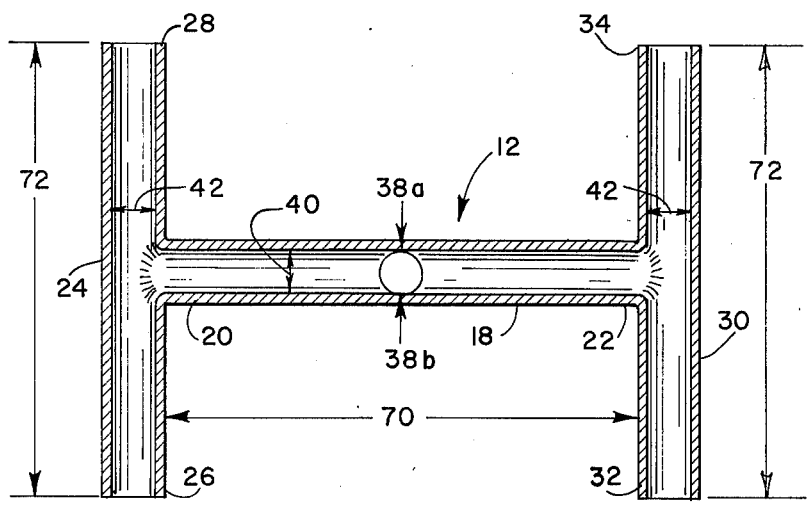
FIG. 2 is a cross-sectional view of the embodiment shown in FIG. 1 taken at line 2—2.

In FIG. 2 a cross-sectional view taken at lines 2—2 of FIG. 1 is shown. First fluid passageway 14, second fluid passageway 18, third fluid passageway 24 and fourth fluid passageway 30 are formed by tubular members in this embodiment as shown more particularly in FIG. 2. In a desirable modification shown in FIG. 2, second fluid passageway 18 has an inner diameter 40 equal to or greater than the inner diameter 38 (shown by arrows 38a and 38b) of first passageway 14. Third passageway 24 and fourth passageway 30 have inner diameters 42 equal to or larger than the inner diameter 40 of second fluid passageway 18.

Figure 3:
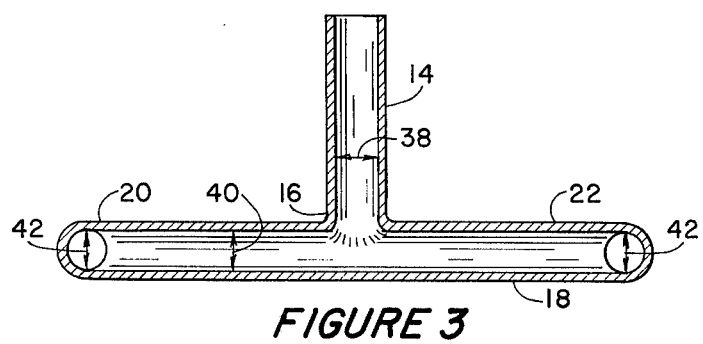
FIG. 3 is a cross-sectional view of the embodiment shown in FIG. 1 taken at line 3—3.

FIG. 3 is a cross-sectional view of the embodiment shown in FIG. 1 taken along line 3—3.

Figure 4:
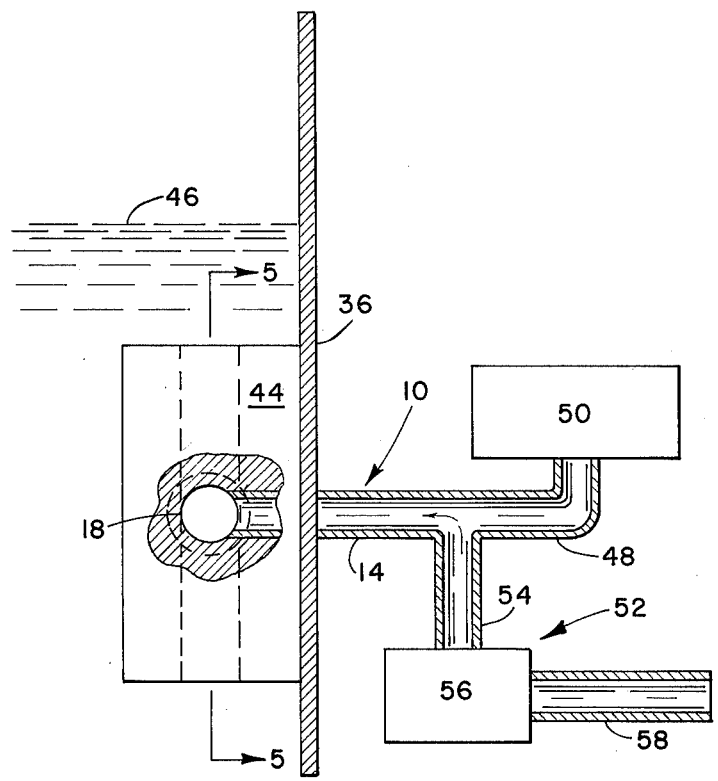
FIG. 4 is a side view a further embodiment of the sensor of the present invention with a broken-out section taken at lines 4—4 of FIG. 5; and, FIG. 5 is a cross-sectional view of a further embodiment of the apparatus of the present invention.

FIG. 4 is a side view of a further embodiment of the apparatus of the present invention where fluid passageways 14, 18, 24 and 30 are formed in a block 44 of a suitable material such as plastic, metal or the like. In FIG. 4 block 44 containing passageways 14, 18, 24 and 30 is shown positioned next to a wall 36 of the vessel. Sensor apparatus 10 is shown with first passageway 14 joining block 44 and a pressure and level sensing device 50. Pressure and level sensor 50 is positioned on a second end 48 of fluid passageway 14. A cross-sectional view of a broken-out section shown by lines 4—4 in FIG. 5 shows the junction of first fluid pasageway 14 with second passageway 18 inside block 44.

Figure 5:
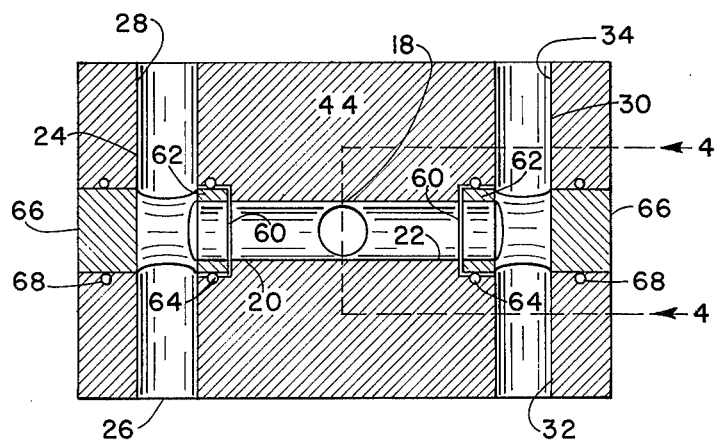

FIG. 5 is a cross-sectional view of the apparatus of FIG. 4 taken along lines 5—5. FIG. 5 also includes pressure communicating diaphrams 60 positioned in first end 20 and second end 22 of second fluid passageway 18. Diaphrams 60 are maintained in position by fittings 62 which include seals 64. Fluid passageways 14, 18, 24 and 30 are formed in block 44, as shown in FIG. 5, by drilling second fluid passageway 18 through block 44, thereafter intersecting second fluid passageway 18 with first fluid passageway 14 and drilling third passageway 24 and fourth passageway 30 to intersect the ends of second passageway 18. Plugs 66 are used to close the drill openings used to drill second passageway 18 and position diaphrams 60. Seals 68 are used to ensure a fluid tight union between plugs 66 and block 44.

In a preferred embodiment, shown in FIG. 2, the length 70 of second fluid passageway 18 is equal to at least 3 times inner diameter 40 of second passageway 18. Further, the length 72 of third passageway 24 and fourth passageway 30 is desirably at least three times inside diameter 42, of third passageway 24 and fourth passageway 30.

In FIG. 4, a further variation of the present apparatus is shown wherein a fluid injection means 52 is shown in fluid communication with first passageway 14. A metering pump 56 or the like for continuously and steadily injecting fluid into passageway 14 is joined to passageway 14 by a pipe 54 so that fluid supplied to an inlet 58 may be steadily injected into passageway 14.

While the present apparatus is effective with fluids generally it is particularly effective when the fluids are liquids. Particularly desirable results are achieved when the liquids contain particulate matter such as slurries and the like. It is desirable that the liquid level 46 be above dampening means 12 although desirable results are achieved when liquid level 46 is at least as high as the top of passageway 14. It is of course desirable in some instances to have vapor bleed systems and the like to ensure that the fluid communication through passageways 14, 18, 24 and 30 is not impeded by air pockets and the like although such difficulties are minimized to a substantial extend when fluid injections means 52 is used. In the operation of sensor apparatus 10, fluid pressure is transmitted through third passageway 24 and fourth passageway 30 to second passageway 18 and thus to first passageway 14 which is in fluid communication with sensing apparatus 50. The particular arrangement of passageways results in dampening pressure fluctuations and the like and particularly when second passageway 18 is arranged in a horizontal orientation the entry of solids and the like into second passageway 18 is minimized. Such entry of particulate matter is particularly minimized whenever fluid injection means 52 is used to supply a steady flow of fluid which does not materially effect the accuracy of pressure sensor 50. Such a fluid injection tends to prevent the entry of particulate material into second passageway 18 and tends to eject particulate matter which does enter.

Such injections are particularly effective when the passageways are sized as discussed above with second passageway 18 having an inner diameter 40 equal to or greater than the inner diameter 38 of first passageway 14 and wherein third passageway 24 and fourth passageway 30 have inner diameters equal to or greater than inner diameter 40 of second passageway 18. Preferably the inner diameters of the fluid passageways increase in the order, first passageway 14 less than second passageway 18 less than third passageway 24 and fourth passageway 30.

In a further embodiment of the present invention which is believed particularly useful for very dense slurries or very turbulent slurries, diaphrams 60 may be positioned at the ends of second passageway 18 to prevent the entry of particulate matter into second passageway 18. Such an embodiment is shown in FIG. 5. While this embodiment does protect against inaccuracies due to the entry of particulate matter and the like the diaphrams do introduce an additional source of variation into the determination and in some instances this embodiment is slightly less accurate than the embodiments discribed above wherein no diaphrams are used although it does provide a high degree of reliability in heavy duty applications.

As indicated above, fluid communication between the fluid contained in the vessel and sensor 50 is established via third and fourth passageways 24 and 30, second passageway 18 and first passageway 14. Fluid communication is thus established so that pressure variations and level variations in the fluid are readily determined by pressure sensor 50 but so that inaccuracies due to pressure fluctuations, particulate material impingement and the like are greatly minimized.

Clearly the apparatus of the present invention is readily fabricated from materials such as are commonly used in similar instruments and in particular block 44 may be of any suitable material such as metal, plastic or the like. It is believed that such materials are well known to those skilled in the art and need not be discussed further.

Having thus described certain preferred embodiments of the present invention, it is pointed out that the embodiments described above are illustrative, rather than limiting, in nature and that many variations and modifications are possible within the scope of the present invention. It is anticipated that many such variations and modifications may appear obvious and desirable to those skilled in the art upon a review of the foregoing description of preferred embodiments.

Having thus described the invention, I claim:
1. A sensor apparatus for determining fluid levels and pressures in a fluid-containing vessel, said sensor comprising:
 a. a mounting means including a first fluid passageway positioned therethrough, said first fluid passageway having a first and a second end;
 b. a pressure sensing means in pressure sensing contact with said first end of said first fluid passageway;
 c. a pressure fluctuation dampening means positioned in fluid communication with said second end of said first fluid passageway, said dampening means comprising:
  1. a second fluid passageway having a first and a second end and positioned in fluid communication with said second end of said first fluid passageway so that said second end of said first fluid passageway joins said second fluid passageway between said first and second ends of said second fluid passageway;
  2. a third passageway, having a first and a second end, positioned in fluid communication with said first end of said second fluid passageway so that said first end of said second fluid passageway joins said third fluid passageway between said first and second ends of said third fluid passageway;

3. a fourth fluid passageway, having a first and a second end, positioned in fluid communication with said second end of said second fluid passageway so that said first end of said second fluid passageway joins said fourth fluid passageway between said first and second ends of said fourth fluid passageway; so that fluid pressure is communicated through said third and fourth fluid passageways, said second fluid passageway, and said first passageway to said pressure sensing means.

2. The apparatus of claim 1 wherein said second fluid passageway has a diameter equal to or greater than the diameter of said first fluid passageway.

3. The apparatus of claim 2 wherein said third and fourth fluid passageways have diameters equal to or greater than the diameter of said second fluid passageway.

4. The apparatus of claim 3 wherein a fluid injection means is positioned in fluid communication with said first fluid passageway.

5. The apparatus of claim 1 wherein said first fluid passageway comprises a tubular member.

6. The apparatus of claim 5 wherein said second, third and fourth fluid passageways comprise tubular members.

7. The apparatus of claim 5 wherein said second, third and fourth fluid passageways are formed as boreholes in a block of a suitable material.

8. The apparatus of claim 7 wherein a pressure transmitting diaphram means is positioned in each of said first and second ends of said second fluid passageway to prevent fluid flow into said second fluid passageway while allowing pressure communication through said second fluid passageway.

9. The apparatus of claim 1 wherein said second fluid passageway joins said first fluid passageway substantially perpendicularly.

10. The apparatus of claim 9 wherein said third and fourth fluid passageways join said second fluid passageway substantially perpendicularly.

11. In a sensor for determining fluid levels and pressures in a fluid-containing vessel, said sensor including a mounting means having a first fluid passageway positioned therethrough, said first fluid passageway fluidly communicating the inside of said vessel and said sensor, the improvement comprising; positioning a pressure fluctuation dampening means in fluid communication with a first end of said first fluid passageway, said dampening means comprising:

a. a second fluid passageway having a first and a second end and positioned in fluid communication with said first end of said first fluid passageway so that said first end of said first fluid passageway joins said second fluid passageway between said first and second ends of said second fluid passageway;

b. a third fluid passageway having a first and a second end positioned in fluid communication with said first end of said second fluid passageway so that said first end of said second fluid passageway joins said third fluid passageway between said first and second ends of said third fluid passageway;

c. a fourth fluid passageway having a first and a second end positioned in fluid communication with said second end of said second fluid passageway so that said first end of said second fluid passageway joins said fourth fluid passageway between said first and second ends of said fourth fluid passageway;

so that fluid pressure is communicated through said third and fourth fluid passageways, said second fluid passageway, and said first passageway to said pressure sensing means.

* * * * *